May 3, 1949.　　　　R. L. PEEK, JR　　　　2,468,837
MAGNETOSTRICTIVE TRANSDUCER
Filed Aug. 2, 1945　　　　　　　　　　　　　　2 Sheets-Sheet 1

INVENTOR
R. L. PEEK, JR.
BY
ATTORNEY

May 3, 1949.  R. L. PEEK, JR  2,468,837
MAGNETOSTRICTIVE TRANSDUCER
Filed Aug. 2, 1945  2 Sheets-Sheet 2

INVENTOR
R. L. PEEK, JR.
BY
ATTORNEY

Patented May 3, 1949

2,468,837

UNITED STATES PATENT OFFICE 2,468,837

MAGNETOSTRICTIVE TRANSDUCER

Robert L. Peek, Jr., New York, N. Y., assignor to Bell Telephone Laboratories, Incorporated, New York, N. Y., a corporation of New York Application August 2, 1945, Serial No. 608,573

10 Claims. (Cl. 177—386)

This invention relates to magnetostrictive devices and more particularly to such devices especially suitable for the propagation of supersonic submarine signals.

One object of this invention is to obtain efficient propagation or reception of supersonic compressional wave signals of any one of a series of preassigned frequencies.

Another object of this invention is to enable selective alteration of the directional pattern of a supersonic submarine signaling device.

In one illustrative embodiment of this invention, a magnetostrictive device comprises an annular magnetostrictive core mounted to be capable of substantially free extensional vibration, a magnetic system for polarizing the core and a signal coil or coils in electromagnetic coupling relation with the core for superimposing a signal flux upon the polarizing flux or conversely for converting vibrations of the core into signal currents.

In accordance with one feature of this invention, the magnetic system aforenoted and the signal coil or coils are cooperatively associated so that the core is excited to vibrate extensionally in other than its fundamental mode whereby different arcuate portions of the core vibrate non-cophasically or, conversely, signal currents may be induced in the coil or coils by vibration in which the motions of different portions of the core are out of phase.

More specifically, in accordance with one feature of this invention, the magnetic system and the signal coil or coils are correlated to produce magnetostrictive effects of opposite sign in adjacent sectors of the core whereby for preassigned frequencies higher than that corresponding to extensional vibration of the core in its fundamental mode, two or more diametrically opposite nodes are produced in the core.

In accordance with a further feature of this invention, the magnet system and the coil or coils are constructed and arranged to allow selective excitation of the core for extensional vibration in either its fundamental or any one of a number of higher modes.

The invention and the above-noted and other features thereof will be understood more clearly and fully from the following detailed description with reference to the accompanying drawing in which.

Figure 1:
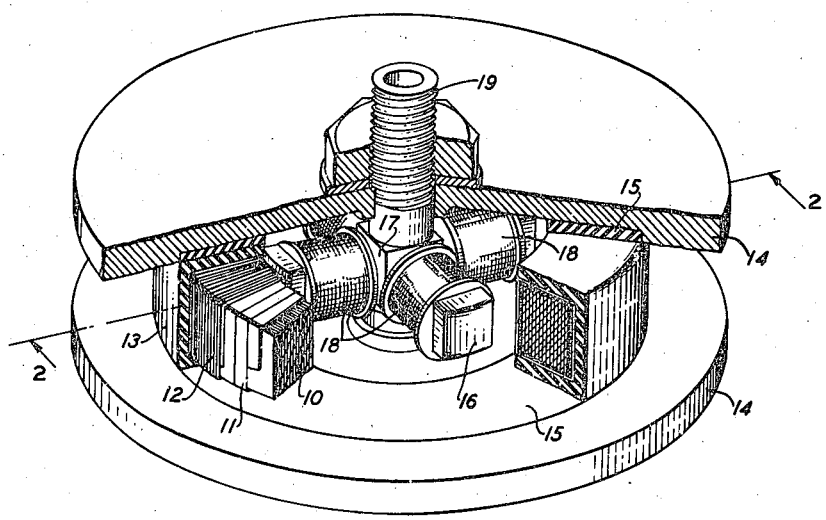
Fig. 1 is a perspective view of a magnetostrictive transducer illustrative of one embodiment of this invention, a portion of the transducer being broken away to show details of construction.
Figure 2:
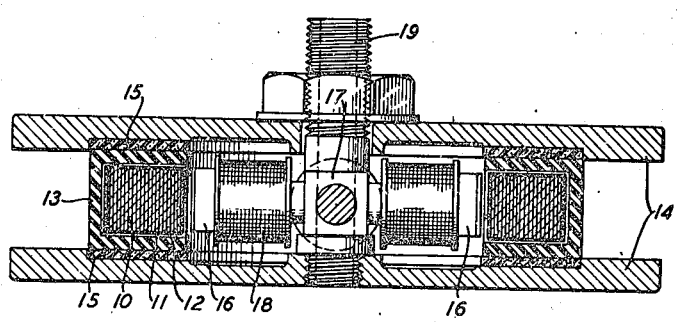
Fig. 2 is a sectional view taken along plane 2—2 of Fig. 1.
Figure 3:
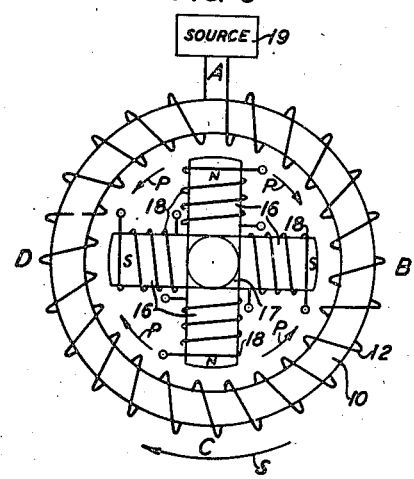
Figure 5:
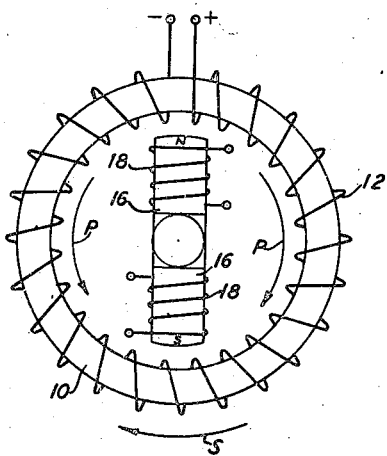
Figure 7:
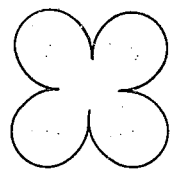
Figure 8:
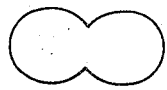
Figure 4:
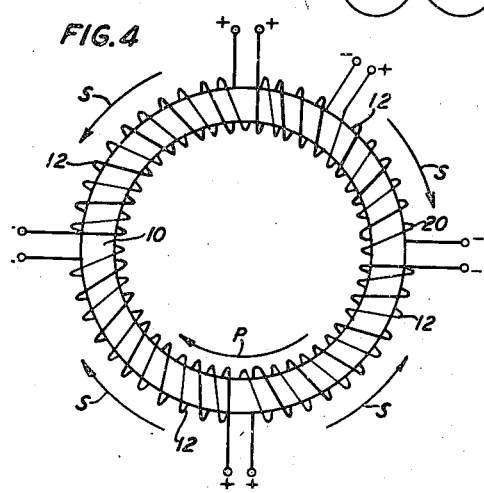
Figure 6:
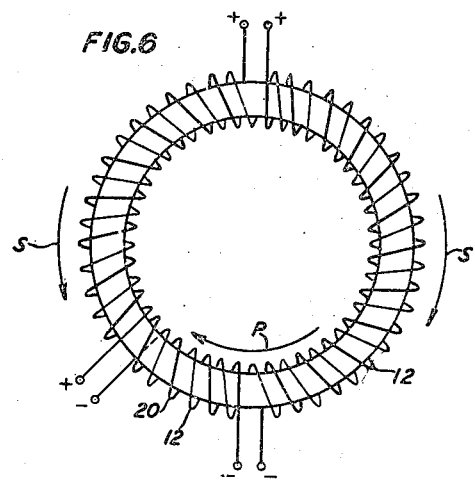

Figs. 3 to 6, inclusive, are diagrams illustrating several ways in which transducers of the construction illustrated in Figs. 1 and 2 may be energized in accordance with this invention;

Fig. 7 is a diagram illustrating the response pattern of transducers energized as shown in Figs. 3 and 4; and Fig. 8 is a diagram illustrating the response pattern of transducers energized as shown in Figs. 5 and 6.

Referring now to the drawing, the transducer shown in Figs. 1 and 2 comprises an annular unit including an annular core 10 of magnetostrictive material, for example nickel or a nickel-iron alloy, having a fabric tape covering 11 thereon and a signal coil or a plurality of such coils 12 wound over the covering 11. The core 10 may be composed of a spirally wound magnetostrictive tape, adjacent turns being insulated from one another, or of a pile-up of annuli or washers of magnetostrictive material also insulated from one another.

The core 10, covering 11 and coil or coils 12 are impregnated with an adhesive insulating material, for example a phenolic condensation product, to bind them securely together into an annular unit. This unit is mounted between a pair of plates 14, for example of metal, resilient, e. g. rubber, rings 15 being provided between the unit and the plates so that the unit is capable of substantially free extensional vibration. If desired, a covering 13 of commercially available rubber, known as ρc rubber, having substantially the same characteristics as sea water for the transmission of compressional wave energy, may be affixed, as by molding, to the top, bottom and outer annular faces of the unit.

Disposed between the plates and encompassed by the annular unit is a magnet system for polarizing the core 10. This system includes one or more pairs of cores or pole-pieces 16 extending outwardly from a magnetic block 17 into immediate proximity to the inner annular face of the unit, and an energizing winding or coil 18 for each of the cores or pole-pieces 16. The coils 18 may be associated electrically in several ways as noted hereinafter. The leading-in conductors for the coils 18 and also for the coil 12 extend through a hollow stud or bolt 19 which serves also to hold the plates 14, rings 15 and annular unit in assembled relation.

If the coils 12 and 18 are poled so that the signal and polarizing fluxes are of the same relative polarities around the core, the core will be excited for extensional vibration in its fundamental mode, that is all point on the core will execute cophasic radial motion and alternate expansion and contraction of the periphery of the core results. Thus, if the transducer unit is suspended in sea water, the core will radiate compressional wave energy substantially uniformly in all directions radially of the core. Conversely, of course, the unit may be utilized as a non-directional receiver, that is to convert compressional waves incident thereon into corresponding signal currents in the coil or coils 12.

It has been found that the core may be excited to vibrate in other than its fundamental extensional mode to produce two or multilobed directional patterns for both propagation and reception of compressional wave energy. More particularly, it has been found that the core may be excited in modes higher than the fundamental to produce bidirectional, quadridirectional or other response or propagating patterns. The principles involved will be understood from the following considerations.

The motion of a ring vibrating in any of its extensional modes may be determined from the equations:

$$u = A \cos n\theta e^{ipt} \quad (1)$$
$$w = -An \sin n\theta e^{ipt} \quad (2)$$

where
$u$ = the radial component of displacement of any point on the ring
$w$ = the tangential component of such displacement
$A$ = a constant determined by the energy input
$n$ = zero or an integer, corresponding to the fundamental and successively higher modes
$\theta$ = the angle, measured from mid-way between two nodes, of the point
$e$ = the Naperian base
$i = \sqrt{-1}$
$t$ = time, and
$p = 2\pi f$, where $f$ is the frequency of vibration. If $c$ is the velocity of sound in the ring material and $D$ the mean diameter of the ring, the frequency of vibration for any mode is given by the relation:

$$f = \frac{c}{\pi D}\sqrt{1+n^2} \quad (3)$$

so that for vibration in the fundamental mode at a specified frequency the mean circumference, $\pi D$, of the ring should be substantially equal to the wavelength corresponding to the specified frequency. For higher modes for any given ring, the frequency, $f$, of vibration, then, is $$\sqrt{1+n^2}$$

times the frequency, $f_0$, for the fundamental mode.

For vibration in the fundamental mode $n=0$, the tangential component, $w$, also is zero and the radial component, $u$, is independent of the angle $\theta$ so that the motion at all points on the ring is in phase, equal and radial. For vibration in other modes, however, the radial component, $u$, varies sinusoidally with $\theta$ and all parts of the ring do not vibrate in phase. For example, if $n=1$, nodes of radial motion occur at $\theta=90$ degrees and $\theta=270$ degrees and one-half of the ring, for example corresponding to values of $\theta$ from 90 degrees to 270 degrees, vibrates in opposite phase to the other half, that is for values of $\theta$ between 270 degrees and 90 degrees. For higher modes, i. e., $n=2$, 3, etc., the number of nodes and also phase reversals of motion around the ring increases, the number of nodes and phase reversals being, in general, $2n$.

The tangential displacement, $w$, is a maximum at the nodes and a minimum, substantially zero, at points mid-way between nodes. The strain in the ring material varies with the angle $\theta$, and reverses in sign at the nodes. Thus, for example, for the case where $n=1$, one-half of the ring will be in compression while the other half is in tension.

Vibration of the magnetostrictive core 10 in modes higher than the fundamental is realized by correlation of the polarizing and signal fluxes to provide the reversals in sign of the strains in various portions of the core in accordance with the mode desired, the sign of the strain in any portion of the core being determined, of course, by whether the flux threading that portion is increasing or decreasing or, viewed in another way, by whether the signal flux aids or opposes the polarizing flux.

A specific example of the correlation involved is illustrated in Fig. 3 for the case where $$n=2, f=\sqrt{5}f_0$$

For this case, as indicated above, there will be four nodes and phase reversals of strain around the core. As shown in Fig. 3, the magnet system for polarizing the core 10 includes four cores or pole-pieces 16 in space quadrature and poled as shown. The direction of flow of the direct current or polarizing flux for the four portions or quadrants of the core is indicated by the arrows P. The signal coil 12 is continuous so that the signal flux path is in the same direction around the core as indicated by the arrow S. The energizing current for the signal coil 12 is obtained from a suitable source 19.

It is apparent from Fig. 3 that at any instant the sign of the flux changes and, hence, of the strains, is the same in the quadrants AB and CD, and BC and DA, but that the sign of the flux changes in the quadrants AB and CD is opposite to that in the quadrants BC and DA. That is to say, when the signal flux is of the polarity to aid the polarizing flux in the quadrants AB and CD, it opposes the polarizing flux in the quadrants BC and DA, and vice versa. Thus, there are four reversals of phase of motion around the ring and four nodes are produced. Consequently, and as has been established, the directional pattern, in the plane of the core, of a submarine signal transducer of the construction illustrated in Figs. 1 and 2 and wherein the polarizing and signal fluxes are of the relative directions indicated in Fig. 3, comprises four similar primary lobes in space quadrature, the axis of the lobes being substantially coincident with the diameters at 45 degrees to the diameter between opposite nodes. In the dimension normal to the plane of the core, the directional pattern comprises two main lobes with axes substantially coincident with the plane of the ring and minima at the axis normal to this plane.

The four phase reversals obtained by the correlation of polarizing and signal fluxes illustrated in Fig. 3 may be obtained also as shown in Fig. 4. In this case, the signal coil 12 is divided into four equal parts each coupled to a respective quadrant of the core 10 and the four coil parts are energized from the source 19 in such manner that adjacent coil parts are in phase opposition as indicated by the polarity signs. The relative direction of the signal flux in the several quadrants is as indicated by the arrows S; the polarizing flux has the same direction around the core 10 as indicated by the arrow P and may be obtained by a separate biasing or polarizing winding 20 or by remanence in the core.

Transducers for producing a bidirectional pattern are illustrated in Figs. 5 and 6. In the former, the signal coil 12 is continuous around the core 10 and the two halves of the core 10 are polarized oppositely by the magnet 16, the relative directions of the signal and polarizing fluxes being indicated by the arrows S and P, respectively. The excitation, then, is for the mode for which $$n=1 \text{ and } f=\sqrt{2}f_0$$

Two nodes and phase reversals are produced, the directional pattern in the plane of the core comprises two similar primary lobes, the axes of which are substantially coincident with the diameter normal to the magnet 16, and the directional pattern in the direction normal to this plane comprises two primary lobes with minima on the core axis normal to the plane of the core.

In Fig. 6, the signal coil 12 is divided into two halves operated in phase opposition as indicated by the polarity signs and signal flux arrows S and the polarizing flux has the same direction around the core as indicated by the arrow P. The directional patterns for the construction shown in Fig. 6 are of the same form as those for the construction shown in Fig. 5 and described above.

The directional patterns noted above obtain for both propagation and reception of compressional waves. When the transducer is utilized for reception, the signal coil or coils 12 are connected, of course, to a suitable output circuit or circuits and the output current or currents, for cases where the coils are connected for extensional vibration of the core 10 at modes higher than the fundamental, will be dependent upon the direction of the source of the compressional waves received, relative to the transducer. The latter may be mounted for rotation about the axis thereof normal to its plane or about one of its diameters so that the direction noted may be determined by rotating the transducer until the output current is a minimum.

It will be understood that a single transducer unit may be employed to provide selectively any one of a number of directional patterns or to propagate a series of preassigned frequencies by changing the connections of the signal coils or of the polarizing winding. Thus, for example, in a transducer of the construction illustrated in Figs. 1 and 2, if the coils 18 are connected to provide polarizing fluxes of the polarities indicated in Fig. 3, the device is conditioned for excitation or response in the mode for which $n=2$. By simply changing the connections of the coils 18 to provide polarizing flux polarities as indicated in Fig. 5, the same device is conditioned for excitation or response in the mode for which $n=1$. Further, if the coils 18 are not energized, the same device is conditioned for operation in the fundamental mode, for which $n=0$, the polarizing flux being obtained, for example, by remanence in the core or by a direct current supplied to the winding 12. Similarly, as will be apparent, in a structure wherein an auxiliary winding 20 is provided for production of the polarizing flux, by appropriately correlating the polarizing and signal coil connections, the device may be conditioned selectively for excitation or response in any of several modes, i. e., those for which $n=0, 1$ or $2$.

Although in the devices illustrated in Figs. 1, 2, 3 and 5, electromagnets are utilized for producing the polarizing flux, permanent magnets may be utilized. In such case, and if a single diametral magnet is employed, if the signal coil 12 is continuous as illustrated in Fig. 5, the device will be conditioned for vibration in the mode for which $n=1$. If the signal coil 12 is divided into two halves and these are connected in phase opposition, the device may be conditioned for operation in the fundamental mode inasmuch as the signal and polarizing fluxes will be in the same polarity relation around the core.

Of course, the coil 12 may be divided into more than four parts, or more than two pairs of polepieces 16 may be employed, to obtain vibration of the core 10 in modes higher than that for which $n=2$ and, hence, to produce a directional pattern, in the plane of the core, having a correspondingly greater number of primary lobes or to propagate signals of correspondingly higher frequency.

Further, inasmuch as the impedance of the transducer is dependent upon the mode for which it is connected to vibrate, the transducer unit may be utilized as a filter, exhibiting a large change in impedance at any one of a series of frequencies, any one of which may be selected, for example by switching of the polarizing flux producing circuits.

Although specific embodiments of this invention have been shown and described, it will be understood that they are but illustrative and that various modifications may be made therein without departing from the scope and spirit of this invention as defined in the appended claims.

What is claimed is:

1. A magnetostrictive device comprising an annular magnetostrictive core, means mounting said core for substantially free extensional vibration, and means for exciting said core to produce out-of-phase magnetostrictive action in adjacent arcuate portions thereof for effecting extensional vibration of said core in a mode higher than its fundamental.

2. A magnetostrictive device comprising an annular magnetostrictive core, means mounting said core for substantially free extensional vibration, means for polarizing said core, and signal coil means in electromagnetic coupling relation with said core, said polarizing and signal coil means being relatively poled to produce magnetostrictive effects of opposite sign in adjacent arcuate portions of said core.

3. A magnetostrictive device comprising an annular magnetostrictive core, means mounting said core for substantially free extensional vibration, means for polarizing adjacent arcuate segments of said core in opposite directions, and signal coil means in such electromagnetic coupling relation with said sections that the signal and polarizing fluxes in said adjacent sections are in opposite relation.

4. A magnetostrictive device comprising an annular magnetostrictive core, means mounting said core for substantially free extensional vibration, means for producing a polarizing flux threading said core circumferentially and having the same direction around the core, and a pair of signal coils coupled respectively to spaced arcuate segments of said core and oppositely poled.

5. A magnetostrictive device comprising an annular magnetostrictive core, means mounting said core for substantially free extensional vibration, means for polarizing two adjacent quadrants of said core in opposite directions, and signal coil means in such electromagnetic coupling relation with both said quadrants as to produce opposite magnetostrictive effects in said adjacent quadrants.

6. A magnetostrictive device comprising an annular magnetostrictive core, means mounting said core for substantially free extensional vibration, a pair of oppositely poled signal coils in electromagnetic coupling relation respectively with adjacent quadrants of said core, and means for polarizing said quadrants in the same direction.

7. A magnetostrictive device comprising an annular magnetostrictive core, means mounting said core for substantially free extensional vibration, means for polarizing the semicircular halves of said core in opposite directions, and a signal coil wound in the same direction about both said halves.

8. A magnetostrictive device comprising an annular magnetostrictive core, means mounting said core for substantially free extensional vibration, means for polarizing the four quadrants of said core, adjacent quadrants being oppositely polarized, and a signal coil wound in the same direction about said four quadrants.

9. A magnetostrictive device comprising an annular magnetostrictive core, means mounting said core for substantially free extensional vibration, a signal coil in direct electromagnetic coupling relation with said core, and means for polarizing said core to produce, circumferentially around the core, a plurality of reversals in the sign of the magnetostrictive effect in response to signal currents supplied to said coil.

10. A magnetostrictive device comprising an annular magnetostrictive core, means mounting said core for substantially free extensional vibration, means for polarizing said core circumferentially, and signal coil means wound about said core, said polarizing and signal coil means being relatively poled so that the polarizing and signal fluxes in a series of spaced arcuate segments of the core are in aiding relation and are in opposing relation in the segments intermediate said spaced segments.

ROBERT L. PEEK, Jr.

REFERENCES CITED

The following references are of record in the file of this patent:

UNITED STATES PATENTS

| Number | Name | Date |
| --- | --- | --- |
| 866,128 | Gray | Sept. 17, 1907 |
| 2,005,741 | Hayes | June 25, 1935 |
| 2,076,330 | Wood et al. | Apr. 6, 1937 |
| 2,190,666 | Kallmeyer | Feb. 20, 1940 |
| 2,249,835 | Lakatos | July 22, 1941 |

FOREIGN PATENTS

| Number | Country | Date |
| --- | --- | --- |
| 402,831 | Great Britain | Dec. 11, 1933 |